United States Patent
Huang

(10) Patent No.: US 6,767,143 B2
(45) Date of Patent: Jul. 27, 2004

(54) OPTOELECTRICAL TRANSCEIVER MODULE WITH RELEASING MECHANISM

(75) Inventor: Nan Tsung Huang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/163,832

(22) Filed: Jun. 5, 2002

(65) Prior Publication Data

US 2003/0194190 A1 Oct. 16, 2003

(30) Foreign Application Priority Data

Apr. 12, 2002 (TW) ...................................... 91204872 U

(51) Int. Cl.[7] .............................................. G02B 6/36
(52) U.S. Cl. ........................... 385/92; 385/89; 385/88
(58) Field of Search ........................... 385/139, 88, 89, 385/92–94, 81, 62

(56) References Cited

U.S. PATENT DOCUMENTS

| | | | | |
|---|---|---|---|---|
| 5,901,263 A | * | 5/1999 | Gaio et al. ..................... | 385/92 |
| 5,930,426 A | * | 7/1999 | Harting et al. ................ | 385/56 |
| 6,335,869 B1 | * | 1/2002 | Branch et al. ............... | 361/816 |
| 6,430,053 B1 | | 8/2002 | Peterson et al. | |
| 6,461,058 B1 | * | 10/2002 | Birch et al. .................... | 385/92 |
| 2002/0150353 A1 | * | 10/2002 | Chiu et al. ..................... | 385/88 |
| 2003/0044129 A1 | * | 3/2003 | Ahrens et al. ................. | 385/92 |
| 2003/0214789 A1 | * | 11/2003 | Medina et al. .............. | 361/729 |

OTHER PUBLICATIONS

U.S. patent application Ser. No. 10/080,001, Hwang, filed Feb. 20, 2002.

* cited by examiner

Primary Examiner—Edward J. Glick
Assistant Examiner—Thomas R Artman
(74) Attorney, Agent, or Firm—Wei Te Chung

(57) ABSTRACT

A pluggable optoelectrical transceiver module (99) is adapted to be retained in a metal cage (5). The optoelectrical transceiver module comprises a receptacle (3), a housing (4) covering a front portion (10) of the receptacle, and a releasing mechanism (2). A triangular latch (11) extends from the receptacle and engages with a retaining tab of the cage. A driving device (2) of the releasing mechanism is rotatably attached to the front portion of the receptacle, and moves an ejector (21) forward and rearward. When the driving device is pulled forward, the ejector slides rearward in the receptacle, unlatching the triangular latch from the cage.

18 Claims, 4 Drawing Sheets

OPTOELECTRICAL TRANSCEIVER MODULE WITH RELEASING MECHANISM

BACKGROUND OF THE INVENTION

1. Field of the Invention

The present invention relates to an optoelectrical transceiver module for optical communications, and in particular to an optoelectrical transceiver module pluggable into a metal cage and having a releasing mechanism.

2. Description of the Related Art

Optoelectrical transceiver modules provide bi-directional transmission of data between an electrical interface and an optical data link. The module receives electrically encoded data signals, which are converted into optical signals and transmitted over the optical data link. The module also receives optically encoded data signals, which are converted into electrical signals and transmitted onto the electrical interface.

The optoelectrical module is generally retained in a complementary cage. The cage conventionally comprises spring means located in a rear portion thereof. When the optoelectrical module is withdrawn from the cage, an ejecting block of the optoelectrical module forces a fixed latch of the optoelectrical module out from a retaining hole defined in a spring latch of the cage. The fixed latch is released from the spring latch. The optoelectrical module is then ejected from the cage by the spring means. The optoelectrical module forms a guide rail at a bottom of a front portion thereof. The ejecting block slidably engages in the guide rail at the bottom of the optoelectrical module. In order to withdraw the optoelectrical module from the cage, the ejecting block is manually pushed inwardly, under the optoelectrical module. However, it is inconvenient to manually push the ejecting block at that location. This is particularly so in modem systems having high port densities in and around the cage that restrict access to the ejecting block.

An improved optoelectrical transceiver module, which provides for convenient withdrawal of the module from a complementary cage is desired.

An example of an optoelectrical transceiver that uses a release mechanism is disclosed in co-pending application, U.S. Ser. No. 10/084,526, filed by the same inventor as this application. It is hereby incorporated by reference. Moreover, the copending application U.S. Ser. No. 10/080,001 filed Feb. Feb. 20, 2002 with the same assignee as the invention, discloses one approach regarding release mechanism used with the transceiver module.

SUMMARY OF THE INVENTION

Therefore, an object of the present invention is to provide an optoelectrical module having a release device which is readily operated.

Another object of the present invention is to provide an unlatching mechanism for easily operating the abovementioned release device.

In order to achieve the object set forth above, an optoelectrical transceiver module in accordance with a preferred embodiment of the present invention comprises a receptacle, a housing covering a front portion of the receptacle, and a releasing mechanism. A triangular latch extends from the receptacle and engages with a retaining tab of a cage. A driving device of the releasing mechanism is rotatably attached to a front portion of the receptacle, and moves an ejector forward and rearward. When the driving device is pulled forward, the ejector slides rearward in the receptacle, unlatching the triangular latch from the cage.

Other objects, advantages and novel features of the present invention will be drawn from the following detailed description of a preferred embodiment of the present invention with attached drawings, in which:

DETAILED DESCRIPTION OF THE INVENTION

Figure 1:
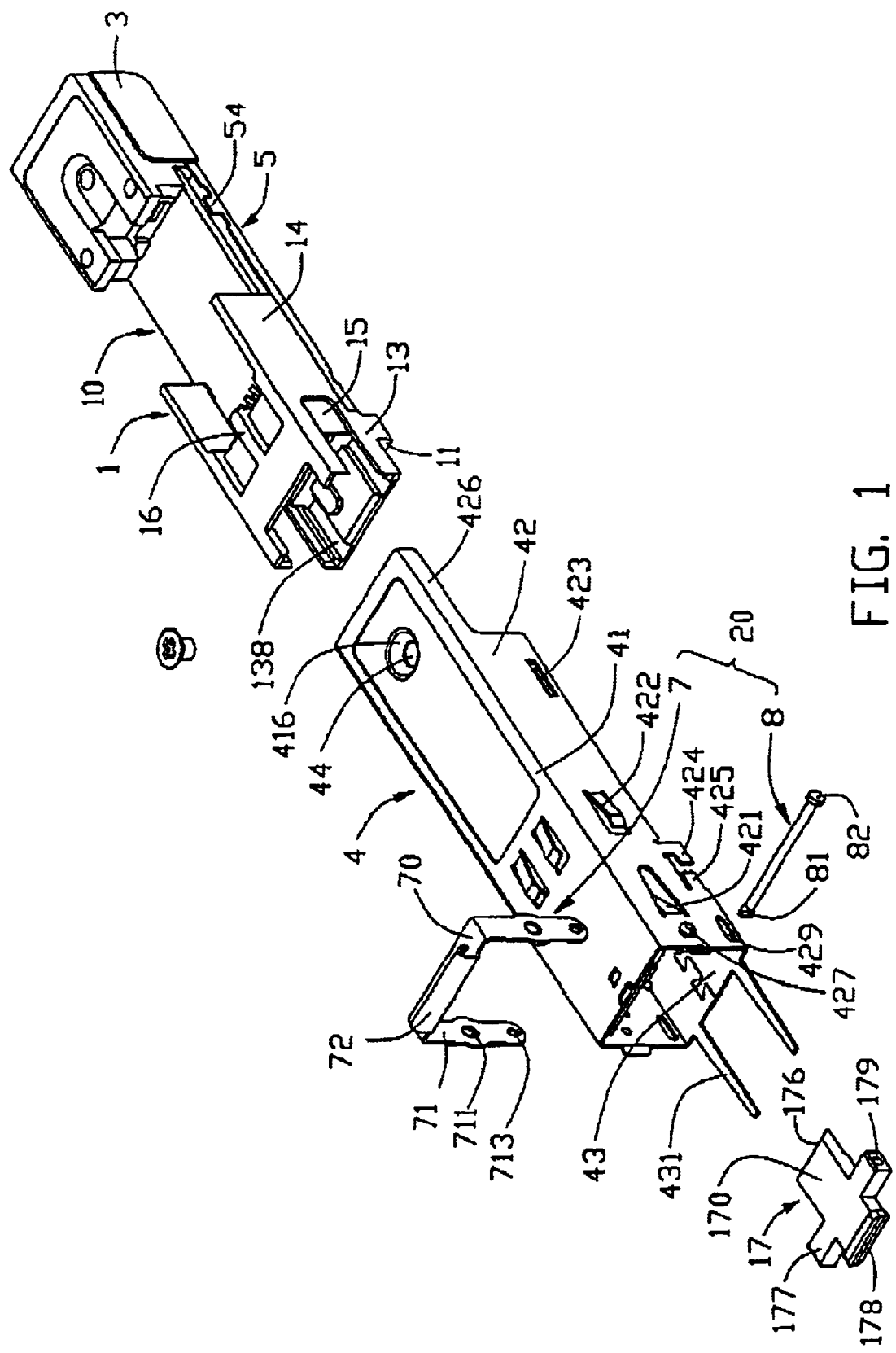
FIG. 1 is an exploded perspective view of a pluggable optoelectrical transceiver module in accordance with the present invention, viewed from a top aspect.

Referring to FIG. 1, an optoelectrical transceiver module 99 in accordance with a preferred embodiment of the present invention comprises an optoelectrical assembly 1 and a releasing mechanism 2. The optoelectrical assembly 1 comprises a receptacle 3 for receiving the optoelectronic devices (not shown) therein, and a housing 4, which covers a rear portion of the receptacle 3. The releasing mechanism 2 is movably attached to the receptacle 3, and comprises an ejector 21, a driving device 22 and a linking rod 23.

Figure 2:
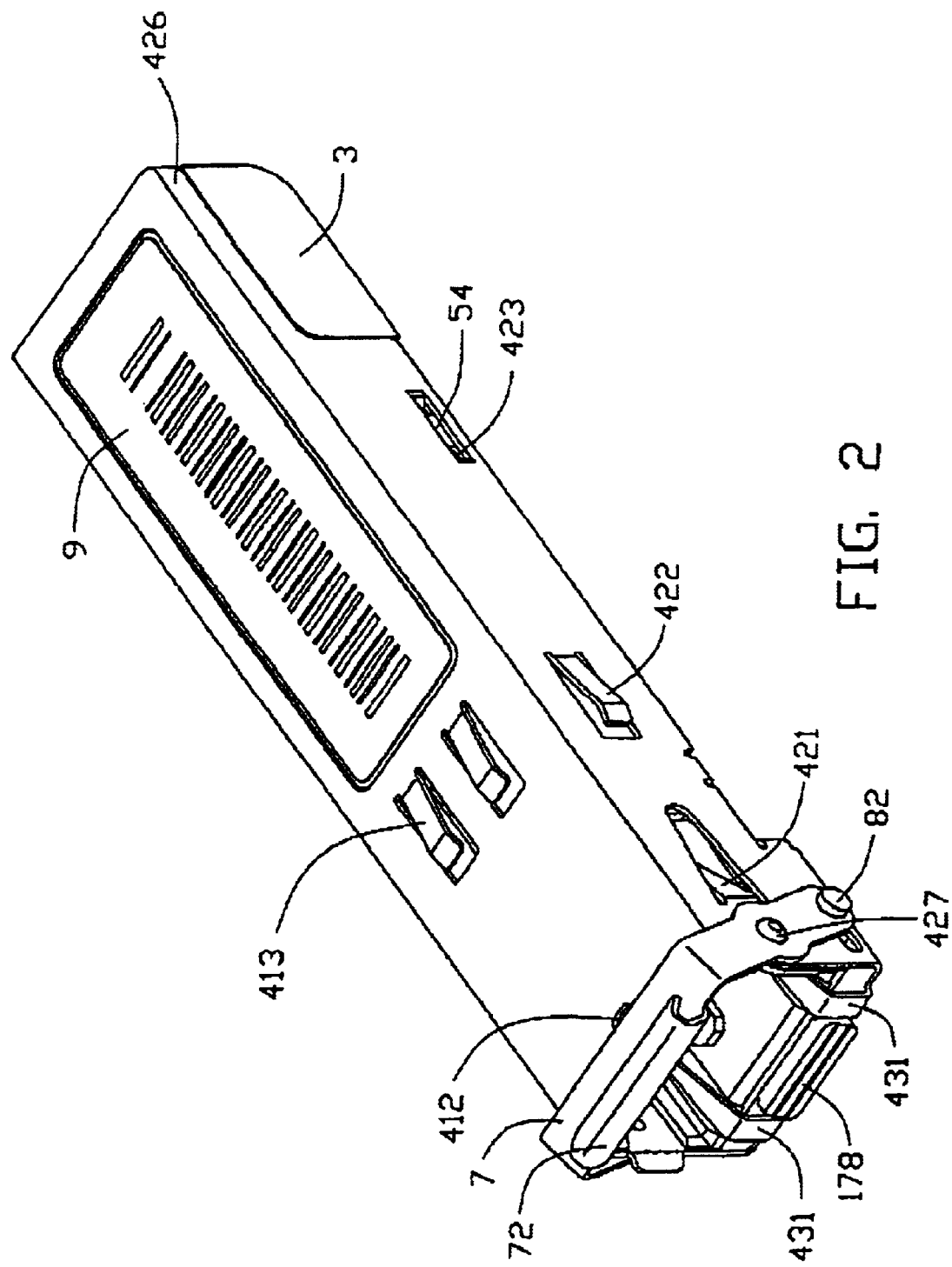
FIG. 2 is an assembled view of FIG. 1.
Figure 3:
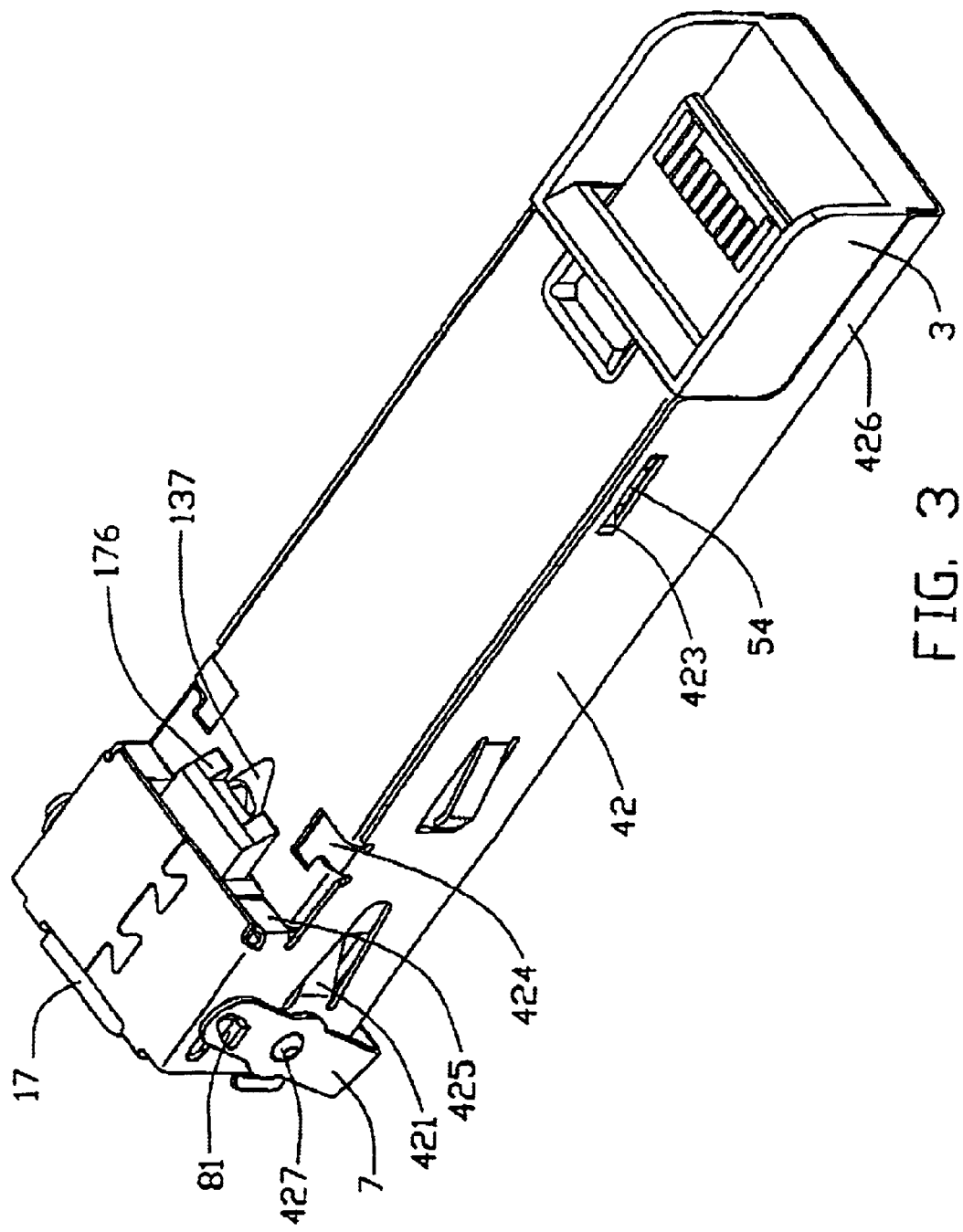
FIG. 3 is also an assembled view of FIG. 1, but viewed from a bottom aspect.

Referring also to FIGS. 2 and 3, the receptacle 3 is made of plastic material, end includes a front portion 10, which is exposed forward of the housing 4, and which is larger in cross-section than the rear portion of the receptacle 3. A pair of guide rails 12 is formed in a bottom wall (not labeled) of the front portion 10 of the receptacle 3. The guide rails 12 project inwardly toward each other. A triangular latch 11 is integrally formed on a bottom wall (not labeled) of the receptacle 3, adjacent to the front portion 10 of the receptacle 3. A pair of stamped pivot heads 13 respectively projects outwardly from opposite side walls (not labeled) of the front portion 10 of the receptacle 3. A horizontal guide slot 14 is defined in each side wall (not labeled) of the front portion 10, below the corresponding pivot head 13.

The releasing mechanism 2 comprises the ejector 21, the U-shaped driving device 22 and the linking rod 23. The ejector 21 comprises a base 210, with a pair of side walls 215 and a front wall (not labeled) extending upwardly from the base 210. A pair of horizontal guide grooves 211 is defined in a front end of the side wall 215 of the ejector 21. A pair of slanted ejecting protrusions 213 is formed at a rear end of the side walls 215. A pair of co-axial through holes 212 is defined through the side walls 215.

The driving device 22 comprises a top beam 221, and a pair of latch arms 222 depending from opposite ends of the top beam 221. A curved handle portion 223 extends upwardly from a front edge of the top beam 221. A pair of pivot holes 224 is respectively defined in middle portions of the latch arms 222. A pair of latch arm guide slots 225 is longitudinally defined below the pivot holes 224 and near free ends of the latch arms 222, respectively.

The linking rod 23 comprises a round stop 232 at one end of the linking rod 23. A washer 234 is mounted to an opposite end of the linking rod 23, and a soldering ball 233 is soldered to the opposite end of the linking rod 23.

In assembly, the ejector 21 is snapped onto the front portion 10 of the receptacle 3 with the guide grooves 211 slidingly accepting the guide rails 12. The driving device 22 is attached to the front portion 10 of the receptacle 3, with the stamped pivot heads 13 on the front portion 10 rotatably engaging within the pivot holes 224 of the driving device 22. The linking rod 23 is inserted through one latch arm guide slot 225 of the driving device 22, one horizontal guide slot 14 of the receptacle 3, the through holes 212 of the ejector 21, the second horizontal guide slot 14, and the second latch arm guide slot 225. The round stop 232 of the linking rod 23 is stopped at the guide slot 225 of the driving device 22. The opposite end of the linking rod 23 protrudes from the second latch arm guide slot 225. The washer 234 slides over the free end of the linking rod 23 and the soldering ball 233 is soldered to the free end of the linking rods 23 to rotatably secure the linking rod 23 to the driving device 22. The driving device 22 is thus rotatably fastened on the front portion 10 of the receptacle 3. Assembly of the releasing mechanism 2 on the optoelectrical assembly 1 is thus completed.

Figure 4:
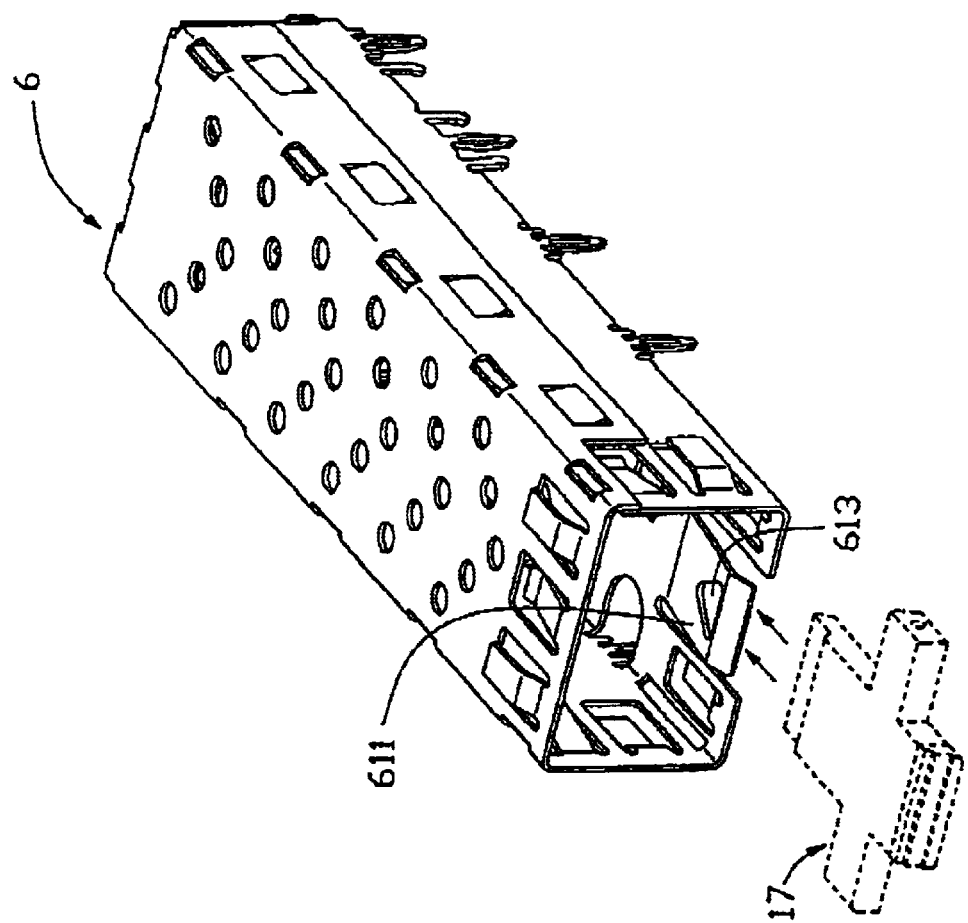
FIG. 4 is a perspective view of a metal cage, and an ejector of the module of FIG. 1 shown with broken lines.

FIG. 4 schematically illustrates a process of releasing the optoelectrical module 99 from engagement inside a complementary cage 5. The cage 5 has an inwardly protruding retaining tab 51 formed at a front part of a bottom plate thereof. The retaining tab 51 has a triangular hole 52 defined therein, and the triangular hole 52 engagingly retains the triangular latch 11 of the optoelectrical module 99 therein. To eject the optoelectrical module 99 from the cage 5, the handle portion 223 of the driving device 22 is pulled forwardly away from the front of the optoelectrical module 99. The driving device 22 thus pushes the ejector 21 rearward along the guide rails 12. The ejecting protrusions 213 of the ejector 21 travel rearward and slide along an upper surface of the retaining tab 51, pressing it downward and away from the optoelectrical module 99. As a result, the retaining tab 51 is released from the triangular latch 11, and the optoelectrical module 99 can be ejected from the cage 5 by conventional spring means (not shown) located in a rear portion of the cage 5.

It should be understood that various changes and modifications to the presently preferred embodiment described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. A pluggable optical transceiver module adapted to be retained in a cage having a retaining tab, the pluggable optical transceiver module comprising:
   a receptacle;
   a conductive housing attached to the receptacle;
   optoelectrical devices received in the receptacle;
   a latch arranged on the receptacle for engaging with the retaining tab of the cage;
   an ejector slidably received in the receptacle for disengaging the latch from the retaining tab of the cage; and
   a driving device exposed from the housing and rotatably attached to the receptacle and movably engaged with the ejector, wherein a pair of guide slots is defined in the receptacle corresponding to a pair of guide slots defined in the driving device, whereby when the driving device is moved in one direction, the ejector moves to unlatch the latch from the retaining tab.

2. The pluggable optical transceiver module as described in claim 1 wherein the receptacle is made from an insulative material.

3. The pluggable optical transceiver module as described in claim 1 wherein the receptacle comprises a pair of guide rails on a bottom of the receptacle.

4. The pluggable optical transceiver module as described in claim 3 wherein the ejector comprises a pair of guide grooves far engaging with the guide rails of the receptacle.

5. The pluggable optical transceiver module as described in claim 1 wherein the ejector comprises at least one slanted protrusion for engaging with the retaining tab of the cage.

6. The pluggable optical transceiver module as described in claim 1 wherein the receptacle is substantially exposed from the housing.

7. The pluggable optical transceiver module as described in claim 1 wherein the receptacle comprises a pair of pivot heads, and the driving device defines a pair of pivot holes for rotatably receiving the pivot heads of the receptacle therein.

8. The pluggable optical transceiver module as described in claim 1 wherein the driving device further comprises a linking rod, a through hole of the ejector is defined through the ejector, and the linking rod is movably received in the guide slots of the driving device and the guide slots of the receptacle, and the through hole of the ejector.

9. A signal transmitting and receiving device comprising:
   a housing;
   signal transmitting and receiving components arranged in the housing;
   a locking device protruding from the housing in a vertical direction;
   a retaining device engagable and disengagable with the locking device;
   an ejector slidably engaged with the housing for separating the locking device from the retaining device; and
   a driving device engaged with the ejector using a rigid linking rod and rotatable to drive the linking rod to substantially linearly move together with the ejector.

10. The signal transmitting and receiving device as described in claim 9, wherein the driving device is mounted at one end of the housing.

11. The signal transmitting and receiving device as described in claim 9, wherein the ejector separates the locking device from the retaining device when the driving device drives the ejector to move.

12. A pluggable optical transceiver module assembly comprising:
   a receptacle with optoelectrical devices therein;
   a conductive housing enclosing at least partially the receptacle;
   a latch formed on at least one of said receptacle and said housing;
   an ejector slidably received in the receptacle and moveable toward the latch; and
   a driving device rotatably attached to a front portion of the receptacle, and actuating said ejector to move;
   wherein said ejector is discrete from but pivotally direction attached to the driving device
   and, wherein a pair of guide slots is defined in the driving device, a linking rod is movably received in the guide slots, so that the driving device actuates the linking rod to move the ejector.

13. The assembly as described in claim 12, wherein said receptacle is received in a cage with a retaining tab latchably engaged with the latch while adapted to be released from the latch by said ejector.

14. The assembly as described in claim 12, wherein one of the receptacle and the driving device comprises a pair of pivot heads, and the other comprises a pair of pivot holes respectively receiving said pair of pivot heads.

15. The assembly as described in claim 12, wherein a pivot point of the driving device relative to the receptacle is rearwardly spaced from a front face of said receptacle.

16. A pluggable optical transceiver module assembly comprising:
   a receptacle with optoelectrical devices therein;
   a conductive housing enclosing at least partially the receptacle;
   a latch formed on said receptacle;
   an ejector slidably received in the receptacle and moveable toward the latch; and
   a driving device rotatably attached to a front portion of at least one of the receptacle and the housing, and actuating said ejector to move;
   wherein said ejector is discrete from but pivotally directly attached to said driving device
   and, wherein a pair of guide slots is defined in the driving device, a linking rod is movably received in the guide slots, so that the driving device actuates the linking rod to move the ejector.

17. The assembly as described in claim 16, wherein said receptacle is received in a cage with thereof a retaining tab latchably engaged with the latch while adapted to be released from the latch by said ejector.

18. The assembly as described in claim 16, wherein a pivot point of the driving device relative to said at least one of the receptacle and the housing, is rearwardly spaced from a front face of said receptacle.

* * * * *